United States Patent
Luo

(10) Patent No.: US 12,163,082 B2
(45) Date of Patent: Dec. 10, 2024

(54) LIQUID CRYSTAL COMPOSITION, LIQUID CRYSTAL DISPLAY PANEL, AND MANUFACTURING METHOD THEREOF

(71) Applicant: TCL CHINA STAR OPTOELECTRONICS TECHNOLOGY CO., LTD., Guangdong (CN)

(72) Inventor: Guoren Luo, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/961,170

(22) PCT Filed: May 12, 2020

(86) PCT No.: PCT/CN2020/089835
§ 371 (c)(1),
(2) Date: Aug. 6, 2022

(87) PCT Pub. No.: WO2021/203518
PCT Pub. Date: Oct. 14, 2021

(65) Prior Publication Data
US 2022/0380676 A1 Dec. 1, 2022

(30) Foreign Application Priority Data
Apr. 9, 2020 (CN) .......................... 202010274354.0

(51) Int. Cl.
G02F 1/1333 (2006.01)
C09K 19/46 (2006.01)
G02F 1/1337 (2006.01)
G02F 1/1341 (2006.01)

(52) U.S. Cl.
CPC ........ *C09K 19/46* (2013.01); *G02F 1/133354* (2021.01); *G02F 1/133788* (2013.01); *G02F 1/1341* (2013.01)

(58) Field of Classification Search
CPC .... C09K 19/38; C09K 19/3804; C09K 19/46; C09K 19/3491; C09K 2019/3405; C09K 2019/3408; C09K 2019/0444; C09K 2019/0448; G02F 1/1333; G02F 1/133354; G02F 1/133788
See application file for complete search history.

(56) References Cited

U.S. PATENT DOCUMENTS

| 8,610,872 | B2 | 12/2013 | Su et al. |
| 2018/0320071 | A1 | 11/2018 | Meng et al. |
| 2019/0185752 | A1 | 6/2019 | Wang et al. |
| 2019/0256776 | A1 | 8/2019 | Huang et al. |
| 2022/0380676 | A1* | 12/2022 | Luo .................. C09K 19/3491 |

FOREIGN PATENT DOCUMENTS

| CN | 101186577 A | 5/2008 |
| CN | 103351880 A | 10/2013 |
| CN | 105753837 A | 7/2016 |
| CN | 107267156 A | 10/2017 |
| CN | 108517219 A | 9/2018 |
| CN | 108794330 A | 11/2018 |
| CN | 109652097 A | 4/2019 |
| CN | 109943347 A | 6/2019 |
| CN | 110229677 A | 9/2019 |
| CN | 110499162 A | 11/2019 |
| TW | 201925435 A | 7/2019 |

* cited by examiner

*Primary Examiner* — Geraldina Visconti
(74) *Attorney, Agent, or Firm* — PV IP PC; Wei Te Chung

(57) ABSTRACT

The present disclosure provides a liquid crystal composition, a liquid crystal display panel, and a manufacturing method of the liquid crystal display panel. Liquid crystal main monomer and polymerizable component monomer are adopted, and mass fractions of the liquid crystal main monomer and the polymerizable component monomer are controlled, so the polymerizable component monomer in the liquid crystal composition can react completely after an UV irradiation, and a second UV irradiation is dispensed. Therefore, it can reduce alignment time of liquid crystals.

18 Claims, 1 Drawing Sheet

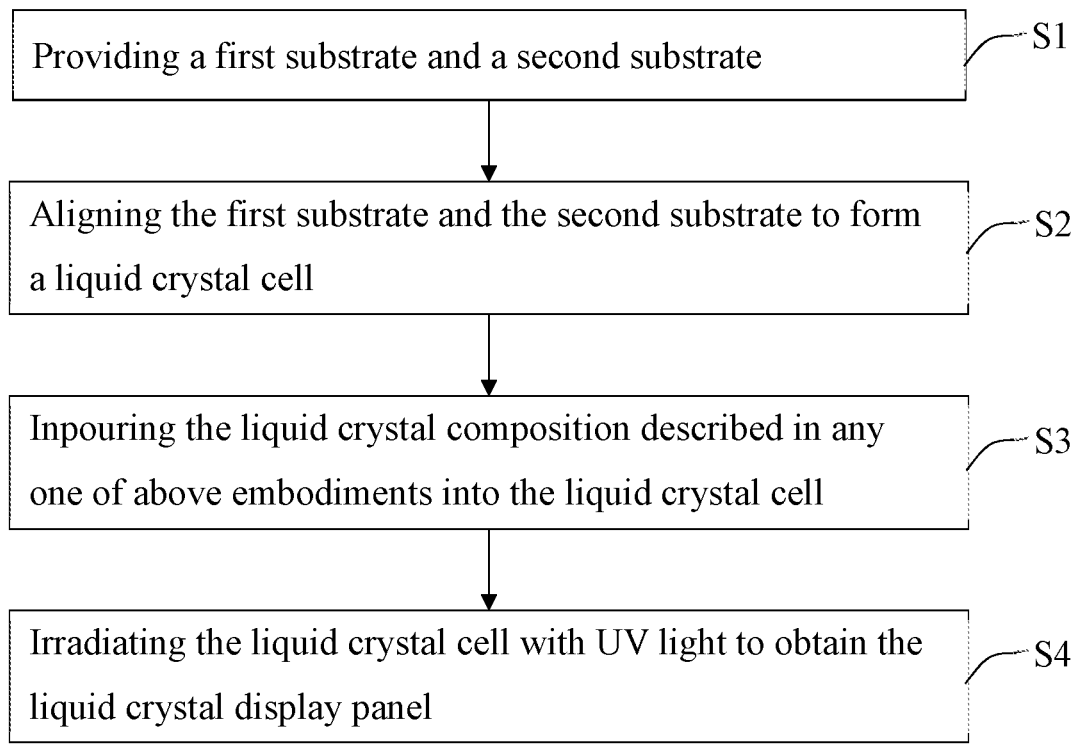

LIQUID CRYSTAL COMPOSITION, LIQUID CRYSTAL DISPLAY PANEL, AND MANUFACTURING METHOD THEREOF

FIELD OF INVENTION

The present disclosure relates to the field of display technologies, and particularly relates to a liquid crystal composition, a liquid crystal display panel, and a manufacturing method of the liquid crystal display panel.

BACKGROUND OF INVENTION

Conventional vertical alignment (VA) liquid crystal display panels are widely used in large-scale displays due to high contrast. In an aligning process of polymer stabilized vertical alignment (PSVA) liquid crystals by using high vertical alignment (HVA) technology, UV irradiation needs to be implemented two times. The first UV irradiation causes formation of pretilt angles of the PSVA liquid crystals, and the second UV irradiation causes reaction of remaining polymerizable components in the PSVA liquid crystals. The two UV irradiation processes take a long time, thereby extending aligning time of the liquid crystals and reducing efficiency of liquid crystal alignment.

Therefore, in prior art, the two UV irradiation processes in the aligning process of the liquid crystals lead to a technical problem of a longer time for liquid crystal alignment.

TECHNICAL PROBLEMS

Embodiments of the present disclosure provide a liquid crystal composition, a liquid crystal display panel, and a manufacturing method thereof to relieve the technical problem that conventional aligning process of liquid crystals needs a long alignment time because of two UV irradiation processes.

TECHNICAL SOLUTIONS

In order to solve the above problems, technical solutions provided in the present disclosure are as follows:

An embodiment of the present disclosure provides a liquid crystal composition, the liquid crystal composition includes a liquid crystal main component and a polymerizable component, the liquid crystal main component includes a polar component, a mass fraction of the polar component is less than 50%, and a mass fraction of the polymerizable component is less than 0.36%, wherein, the polar component is represented by the formula:

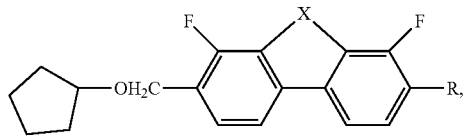

X in the formula of the polar component is selected from one of oxygen or sulfur, R is selected from one of alkyl with 1 to 10 carbon atoms, fluorine-substituted alkyl with 1 to 10 carbon atoms, alkoxy with 1 to 10 carbon atoms, fluorine-substituted alkoxy with 1 to 10 carbon atoms, alkenyl with 2 to 10 carbon atoms, fluorine-substituted alkenyl with 2 to 10 carbon atoms, alkenyloxy with 3 to 8 carbon atoms, or fluorine-substituted alkenyloxy with 3 to 8 carbon atoms; and the polymerizable component is represented by the formula:

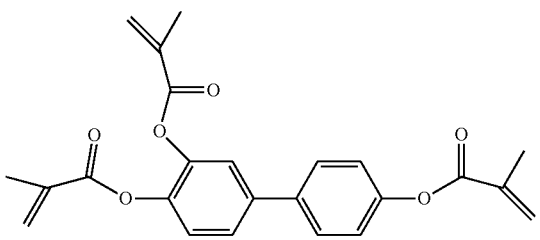 [SMILES: C=C(C)C(=O)Oc1ccc(-c2ccc(OC(=O)C(=C)C)c(OC(=O)C(=C)C)c2)cc1]

with RI being H or F.

In some embodiments, the polar component is represented by the formula:

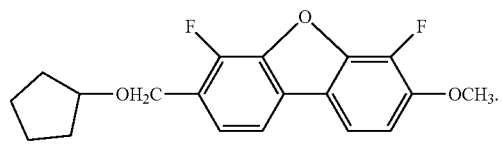

In some embodiments, the polar component is represented by the formula:

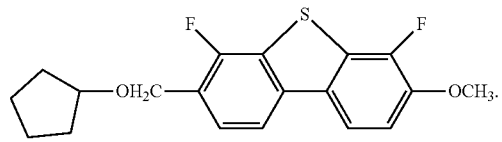

In some embodiments, the polar component is represented by the formula:

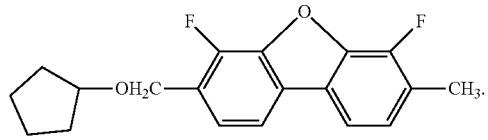

In some embodiments, the polar component is represented by the formula:

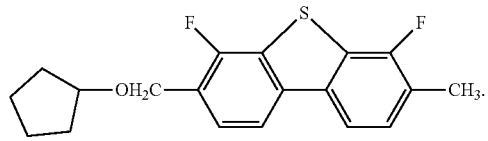

In some embodiments, the polar component is represented by the formula:

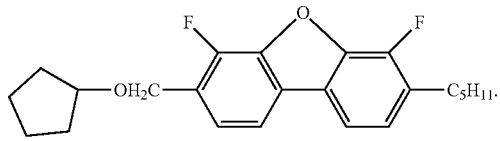

In some embodiments, the polar component is represented by the formula:

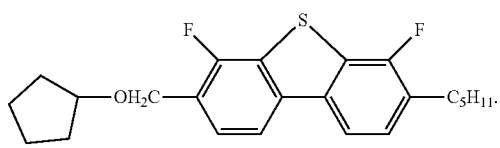

In some embodiments, the polymerizable component is represented by one of the formulas:

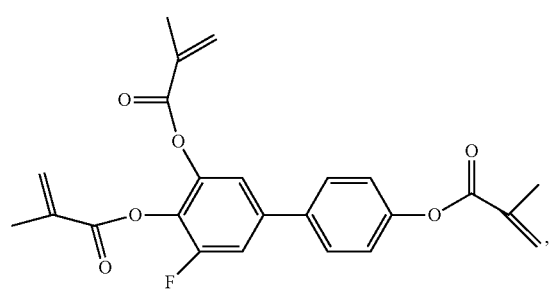 [SMILES: C=C(C)C(=O)Oc1ccc(-c2cc(F)c(OC(=O)C(=C)C)c(OC(=O)C(=C)C)c2)cc1]

, and

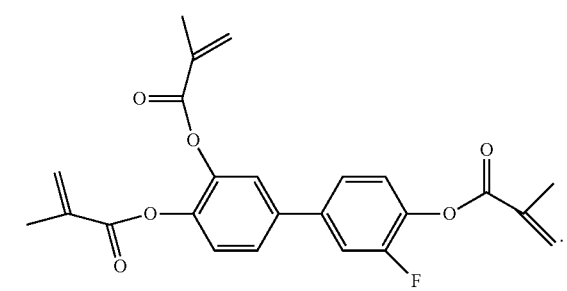 [SMILES: C=C(C)C(=O)Oc1ccc(-c2ccc(OC(=O)C(=C)C)c(OC(=O)C(=C)C)c2)cc1F]

In some embodiments, the polymerizable component is represented by the formula:

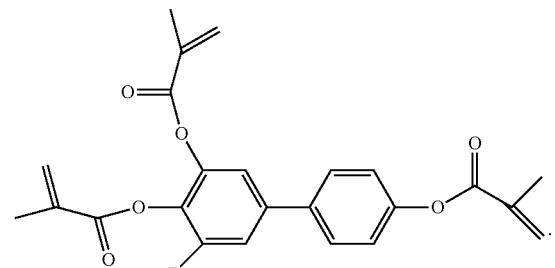

In some embodiments, the polymerizable component is represented by the formula:

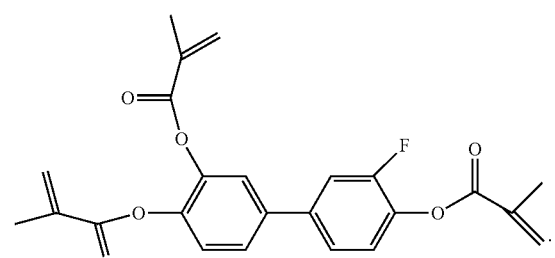

In some embodiments, the polymerizable component is represented by the formulas:

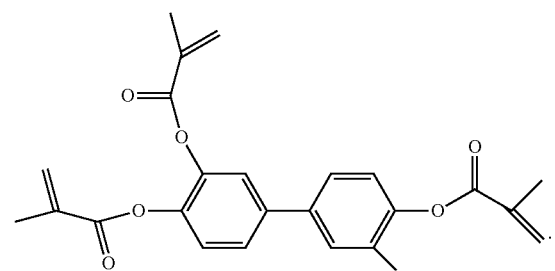

An embodiment of the present disclosure also provides a liquid crystal display panel, the liquid crystal display panel includes a first substrate, a second substrate, and a liquid crystal cell disposed between the first substrate and the second substrate, the liquid crystal cell includes the liquid crystal composition from any one of the above embodiments.

In some embodiments, the polar component is represented by the formula:

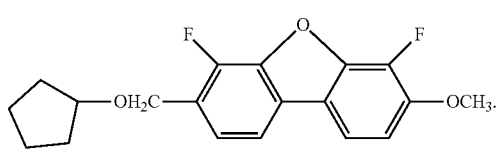

In some embodiments, the the polar component is represented by the formula:

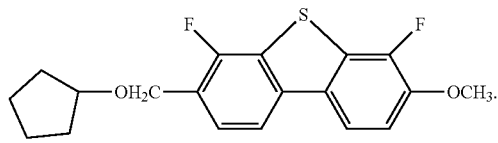

In some embodiments, the polar component is represented by the formula:

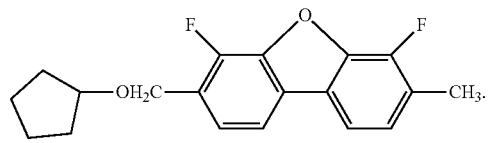

In some embodiments, the polar component is represented by the formula:

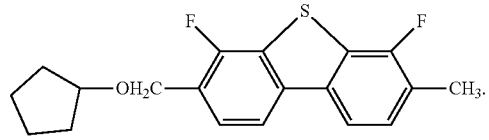

In some embodiments, the polar component is represented by the formula:

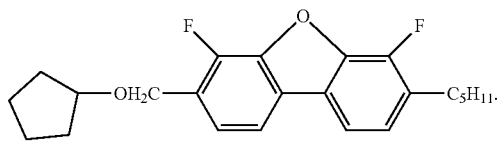

In some embodiments, the polar component is represented by the formula:

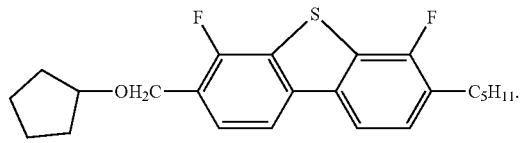

In some embodiments, the polymerizable component is represented by one of the formulas:

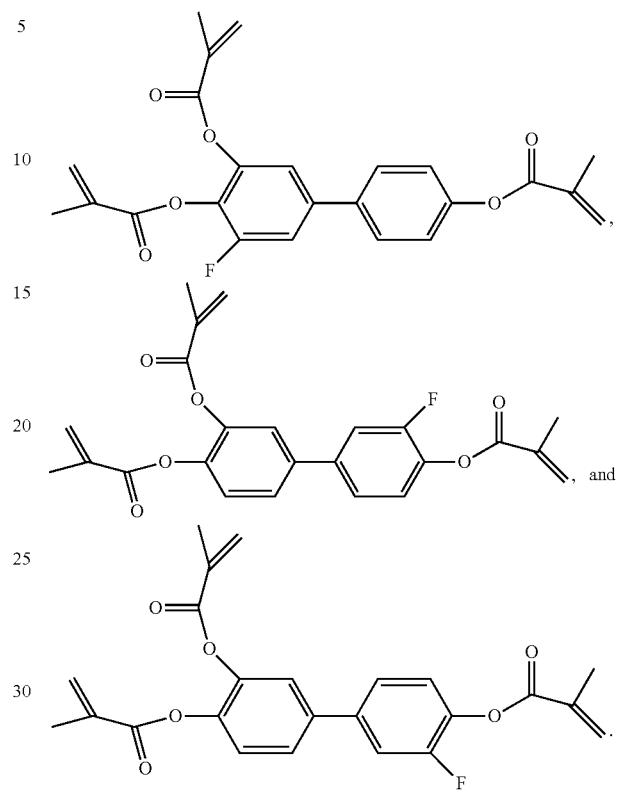

An embodiment of the present disclosure also provides a manufacturing method for a liquid crystal display panel, including:
- providing a first substrate and a second substrate;
- aligning the first substrate and the second substrate to form a liquid crystal cell;
- inpouring the liquid crystal composition in claim 1 into the liquid crystal cell; and
- irradiating the liquid crystal cell with UV light to obtain the liquid crystal display panel.

BENEFICIAL EFFECTS

The present disclosure provides a liquid crystal composition, a liquid crystal display panel, and a manufacturing method thereof. The liquid crystal composition includes a liquid crystal main component and a polymerizable component. The liquid crystal main component includes a polar component, and the mass fraction of the polar component is less than 50%, and the mass fraction of the polymerizable component is less than 0.36%. the polar component is represented by the formula:

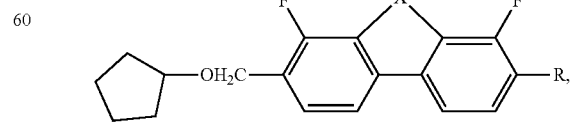

X in the formula of the polar component is selected from one of oxygen or sulfur, R is selected from one of alkyl with 1 to 10 carbon atoms, fluorine-substituted alkyl with 1 to 10 carbon atoms, alkoxy with 1 to 10 carbon atoms, fluorine-substituted alkoxy with 1 to 10 carbon atoms, alkenyl with 2 to 10 carbon atoms, fluorine-substituted alkenyl with 2 to 10 carbon atoms, alkenyloxy with 3 to 8 carbon atoms, or fluorine-substituted alkenyloxy with 3 to 8 carbon atoms. The polymerizable component is represented by the formulas

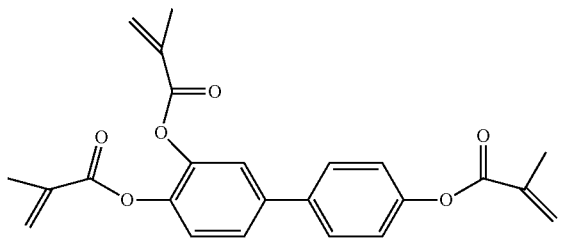

with RI being H or F. In the present disclosure, the liquid crystal main component and the polymerizable component are adopted, and the mass fractions of the liquid crystal main component and the polymerizable component are controlled, so the polymerizable component in the liquid crystal composition can react completely after an UV irradiation, and a second UV irradiation is dispensed. Therefore, it can reduce the alignment time of liquid crystals and relieve the technical problem that the conventional aligning process of liquid crystals needs a long alignment time because of two UV irradiation processes.

DESCRIPTION OF DRAWINGS

FIG. 1 is a flowchart of a manufacturing method of a liquid crystal display panel provided in an embodiment of the present disclosure.

DETAILED DESCRIPTION OF EMBODIMENTS

The present disclosure provides a liquid crystal composition, a liquid crystal display panel, and a manufacturing method thereof. In order to make purposes, technical solutions, and effects of the present disclosure clearer and more definite, the present disclosure will be further described with reference to the attached drawings. It should be understood that specific embodiments described herein are merely used to interpret the present disclosure and are not intended to limit the present disclosure.

The embodiments of the present disclosure aim at the technical problem that the conventional aligning process of liquid crystals needs a long alignment time because of two UV irradiation processes. The embodiments of the present disclosure solve the problem.

An embodiment of the present disclosure provides a liquid crystal composition. The liquid crystal composition includes a liquid crystal main component and a polymerizable component. The liquid crystal main component includes a polar component, and a mass fraction of the polar component is less than 50%. A mass fraction of the polymerizable component is less than 0.36%.

Wherein, the polar component is represented by the formula:

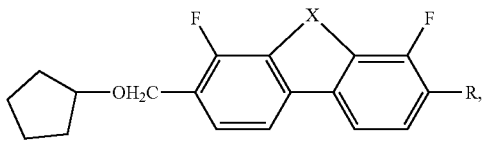

X in the formula of the polar component is selected from one of oxygen or sulfur, R is selected from one of alkyl with 1 to 10 carbon atoms, fluorine-substituted alkyl with 1 to 10 carbon atoms, alkoxy with 1 to 10 carbon atoms, fluorine-substituted alkoxy with 1 to 10 carbon atoms, alkenyl with 2 to 10 carbon atoms, fluorine-substituted alkenyl with 2 to 10 carbon atoms, alkenyloxy with 3 to 8 carbon atoms, or fluorine-substituted alkenyloxy with 3 to 8 carbon atoms.

Wherein, the polymerizable component is represented by the formula:

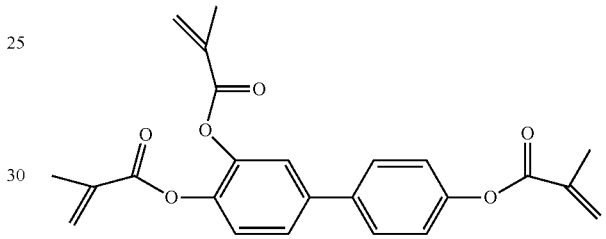

with RI being H or F.

The embodiment of the present disclosure provides a liquid crystal composition. The liquid crystal composition includes a liquid crystal main component and a polymerizable component, and their structural formulas are as above described. The liquid crystal composition is adopted, and the mass fractions of the liquid crystal main component and the polymerizable component are controlled, so pretilt angles of liquid crystals can be formed, and the polymerizable component in the liquid crystal composition can react completely after an UV irradiation, and a second UV irradiation is dispensed. Therefore, it can reduce the alignment time of liquid crystals and relieve the technical problem that the conventional aligning process of liquid crystals needs a long alignment time because of two UV irradiation processes.

It should be noted that in the embodiment of the present disclosure, the liquid crystal composition includes the liquid crystal main component and the polymerizable component, but the embodiment of the present disclosure does not limit that the liquid crystal composition is merely constituted of the liquid crystal main component and the polymerizable component, and the liquid crystal composition may also include other components for forming the liquid crystals.

In the embodiment of the present disclosure, the mass fraction of the polymerizable component is less than 0.36%. Even if the polymerizable component can completely react after one UV irradiation on the liquid crystal composition, the mass fraction of the polymerizable component can also be controlled to further prevent residual of the polymerizable component after one UV irradiation process, thereby prompting the polymerizable components to react completely after one UV irradiation process and relieving the problem of long alignment time of the liquid crystals.

In an embodiment, when R in the formula of the polar component is alkyl with 1 to 10 carbon atoms, and X in the formula of the polar component is oxygen, the the polar component is represented by the formula:

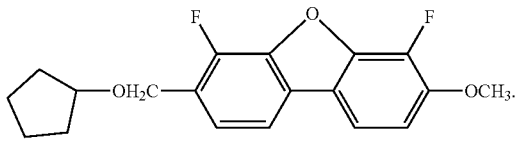

In an embodiment, when R in the formula of the polar component is alkyl with 1 to 10 carbon atoms, and X in the formula of the polar component is sulfur, the the polar component is represented by the formula:

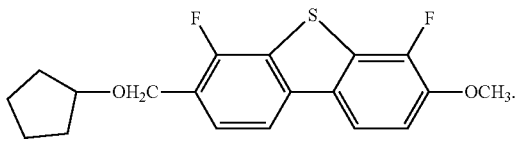

In an embodiment, when R in the formula of the polar component is alkyl with 1 to 10 carbon atoms, and X in the formula of the polar component is oxygen, the the polar component is represented by the formula:

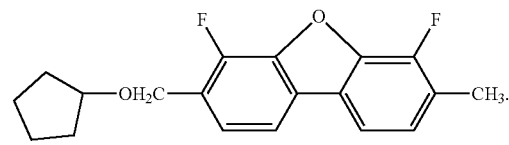

In an embodiment, when R in the formula of the polar component is alkyl with 1 to 10 carbon atoms, and X in the formula of the polar component is sulfur, the the polar component is represented by the formula:

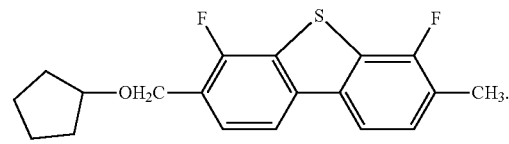

In an embodiment, when R in the formula of the polar component is alkenyl with 2 to 10 carbon atoms, and X in the formula of the polar component is oxygen, the the polar component is represented by the formula:

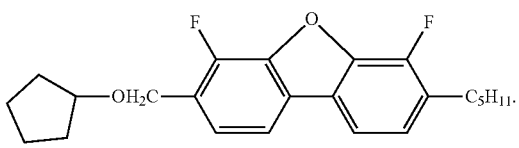

In an embodiment, when R in the formula of the polar component is alkenyl with 2 to 10 carbon atoms, and X in the formula of the polar component is sulfur, the the polar component is represented by the formula:

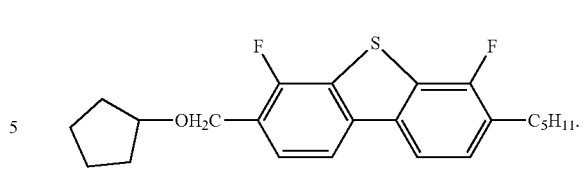

In an embodiment, the polymerizable component monomer is represented by one of the formulas:

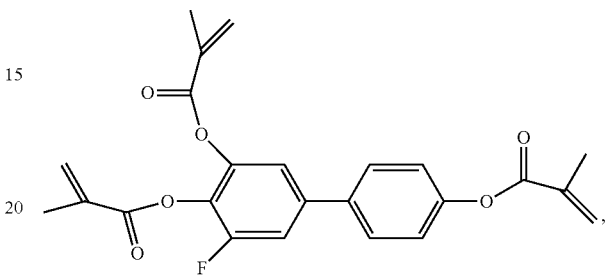

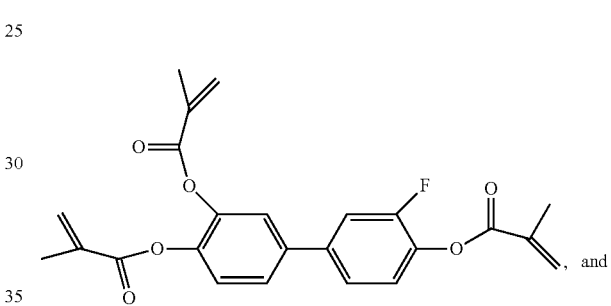, and

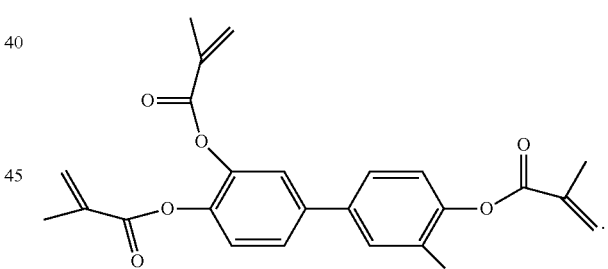.

In an embodiment, the polymerizable component is represented by the formula:

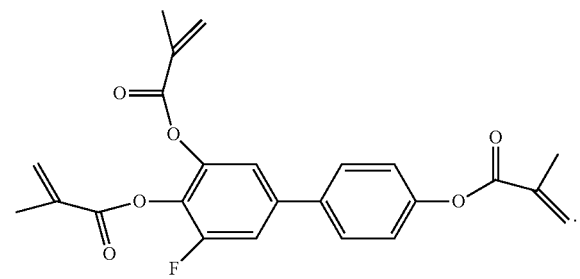 [SMILES: C=C(C)C(=O)Oc1ccc(-c2cc(F)c(OC(=O)C(=C)C)c(OC(=O)C(=C)C)c2)cc1].

In an embodiment, the polymerizable component is represented by the formulae:

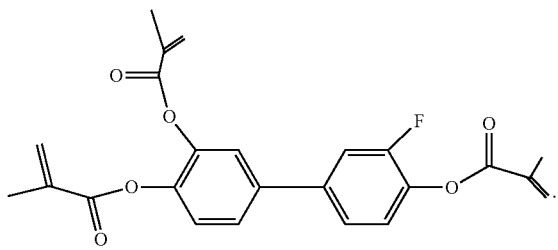 [SMILES: C=C(C)C(=O)Oc1ccc(-c2ccc(OC(=O)C(=C)C)c(OC(=O)C(=C)C)c2)cc1F]

In an embodiment, the polymerizable component is represented by the formula:

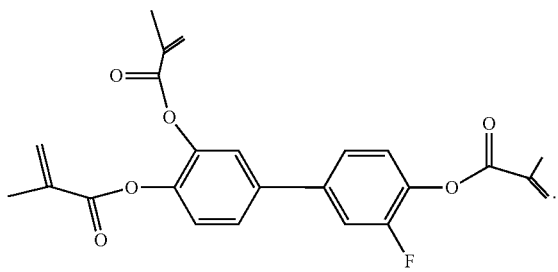 [SMILES: C=C(C)C(=O)Oc1ccc(-c2ccc(OC(=O)C(=C)C)c(OC(=O)C(=C)C)c2)cc1F]

An embodiment of the present disclosure provides a liquid crystal display panel. The liquid crystal display panel includes a first substrate, a second substrate, and a liquid crystal cell disposed between the first substrate and the second substrate, and the liquid crystal cell includes the liquid crystal composition described in any one of the above embodiments.

In an embodiment, in the liquid crystal display panel, the polar component is represented by the formula:

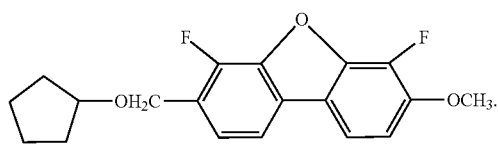

In an embodiment, in the liquid crystal display panel, the polar component is represented by the formula:

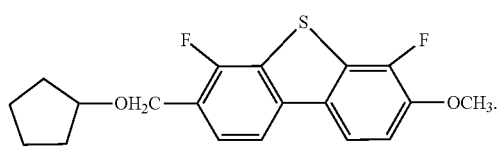

In an embodiment, in the liquid crystal display panel, the polar component is represented by the formula:

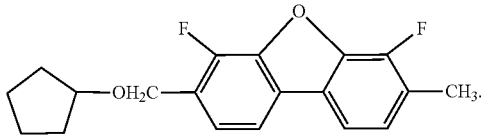

In an embodiment, in the liquid crystal display panel, the polar component is the represented by the formula:

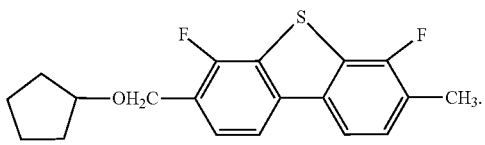

In an embodiment, in the liquid crystal display panel, the polar component is represented by the formula:

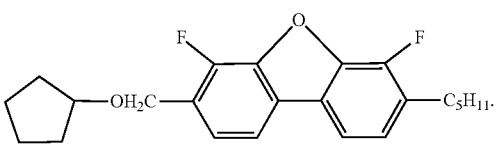

In an embodiment, in the liquid crystal display panel, the polar component is represented by the formula:

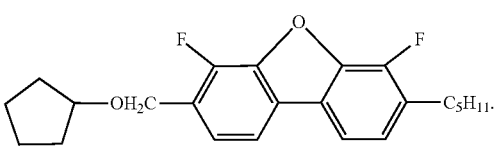

In an embodiment, in the liquid crystal display panel, the polymerizable component is represented by one of the formulas:

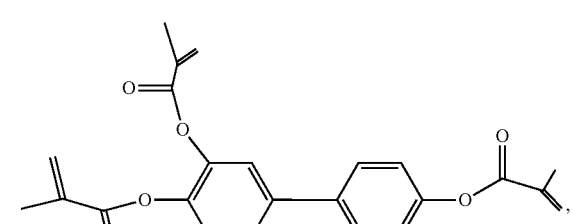

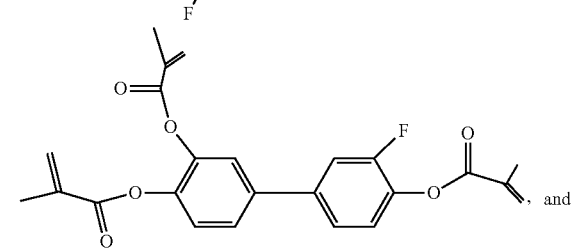

, and

-continued

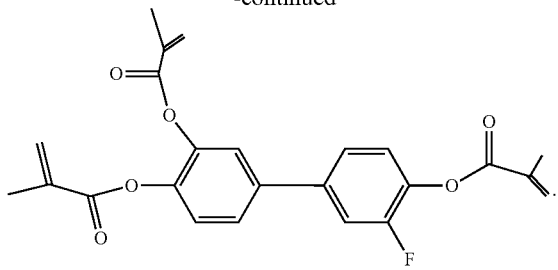

In the embodiment of the present disclosure, the liquid crystal display panel is formed by using the liquid crystal composition as above described. In a manufacturing process of the liquid crystal display panel, the liquid crystal composition is injected into the liquid crystal cell, and the liquid crystal display panel is UV irradiated one time. Then, the liquid crystal composition can form liquid crystals with pretilt angles, and the polymerizable component monomers can react completely without residual. Thus, it reduces the alignment time of the liquid crystals and manufacturing time of the liquid crystal display panel, and improves manufacturing efficiency of the liquid crystal panel.

In an embodiment, the first substrate includes an array substrate, and the second substrate includes a color film substrate.

In an embodiment, the array substrate includes a first substrate, a thin film transistor array layer on the glass substrate, and a first alignment layer on the thin film transistor array layer. The color film substrate includes a second alignment layer, a common electrode layer on the second alignment layer, a color film layer on the common electrode layer, and a second substrate on the color film layer. After aligning the first substrate and the second substrate, the liquid crystal composition diffuses on the alignment film of the first substrate or the second substrate, and then the liquid crystal display panel is UV irradiated to promote the liquid crystals to form pretilt angles on the first alignment film and the second alignment film, and the polymerizable component monomer reacts completely to complete the liquid crystal alignment.

In an embodiment, the alignment film is a vertical alignment film.

Referring to FIG. 1, the embodiment of the present disclosure provides a manufacturing method for a liquid crystal display panel, including:

S1, providing a first substrate and a second substrate;
S2, aligning the first substrate and the second substrate to form a liquid crystal cell;
S3, inpouring the liquid crystal composition described in any one of the above embodiments into the liquid crystal cell; and
S4, irradiating the liquid crystal cell with UV light to obtain the liquid crystal display panel.

In the manufacturing method of the liquid crystal display panel provided in embodiments of the present disclosure, the liquid crystal composition described in above embodiments is injected into the liquid crystal cell, so during aligning the liquid crystals in the liquid crystal cell, the liquid crystals can have pretilt angles after one UV irradiation process, and the polymerizable component monomers can react completely to complete alignment of the liquid crystals. Thus, it reduces alignment time of the liquid crystals and manufacturing time of the liquid crystal display panel, and improves manufacturing efficiency of the liquid crystal panel.

In an embodiment, after manufacturing the first substrate and the second substrate, both the first substrate and the second substrate are provided with an alignment film, and then the first substrate and the second substrate are aligned to promote the liquid crystals to form pretilt angles on the alignment film, and the polymerizable component monomers can react completely, so that a liquid crystal layer be formed after liquid crystal composition aligning. Because only one alignment is needed, it can reduce the time of alignment and the cost of alignment equipment so as to reduce the time of liquid crystal alignment, and improve the efficiency of alignment.

According to the above embodiment, it can be seen that:

The present disclosure provides a liquid crystal composition, a liquid crystal display panel, and a manufacturing method thereof. The liquid crystal composition includes a liquid crystal main component and a polymerizable component. The liquid crystal main component includes a polar component, and the mass fraction of the polar component is less than 50%, and the mass fraction of the polymerizable component is less than 0.36%. The polar component is represented by the formula:

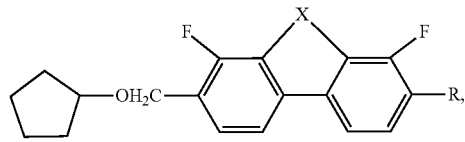

X in the formula of the polar component is selected from one of oxygen or sulfur, R is selected from one of alkyl with 1 to 10 carbon atoms, fluorine-substituted alkyl with 1 to 10 carbon atoms, alkoxy with 1 to 10 carbon atoms, fluorine-substituted alkoxy with 1 to 10 carbon atoms, alkenyl with 2 to 10 carbon atoms, fluorine-substituted alkenyl with 2 to 10 carbon atoms, alkenyloxy with 3 to 8 carbon atoms, or fluorine-substituted alkenyloxy with 3 to 8 carbon atoms. The polymerizable component is represented by the formula:

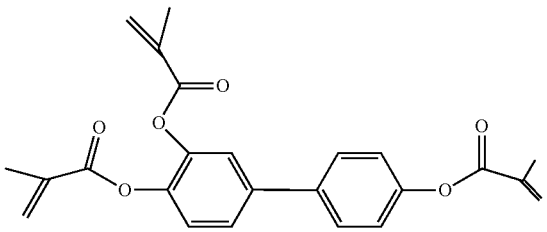 [SMILES: C=C(C)C(=O)Oc1ccc(-c2ccc(OC(=O)C(=C)C)c(OC(=O)C(=C)C)c2)cc1]

with R1 being H or F. The liquid crystal component and the polymerizable component are adopted, and the mass fractions of the liquid crystal component and the polymerizable component are controlled, so the polymerizable component in the liquid crystal composition can react completely after an UV irradiation, and a second UV irradiation is dispensed. Therefore, it can reduce the alignment time of liquid crystals and relieve the technical problem that the conventional aligning process of liquid crystals needs a long alignment time because of two UV irradiation processes.

It can be understood that, for those of ordinary skill in the art, equivalent substitutions or changes can be made according to the technical solutions of the present disclosure and the invention concept, and all these changes or substitutions shall belong to a protection scope of the claims attached to the present disclosure.

What is claimed is:

1. A liquid crystal composition, comprising a liquid crystal main component and a polymerizable component, wherein the liquid crystal main component comprises a polar component, a mass fraction of the polar component is less that 50%, and a mass fraction of the polymerizable component is less than 0.36%;

wherein the polar component is represented by the formula:

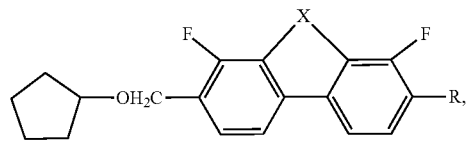

X in the formula of the polar component is selected from one of oxygen or sulfur, R is selected from one of alkyl with 1 to 10 carbon atoms, fluorine-substituted alkyl with 1 to 10 carbon atoms, alkoxy with 1 to 10 carbon atoms, fluorine-substituted alkoxy with 1 to 10 carbon atoms, alkenyl with 2 to 10 carbon atomes, fluorine-substituted alkenyl with 2 to 10 carbon atoms, alkenyloxy with 3 to 8 carbon atoms, or fluorine-substituted alkenyloxy with 3 to 8 carbon atoms; and

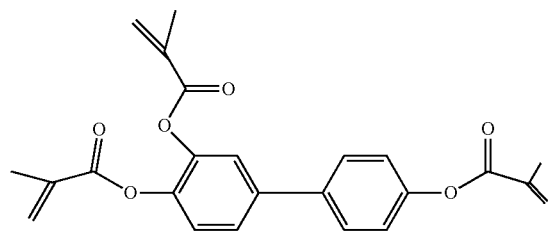 [SMILES: C=C(C)C(=O)Oc1ccc(-c2ccc(OC(=O)C(=C)C)c(OC(=O)C(=C)C)c2)cc1]

wherein the polymerizable component is represented by one of the formulas;

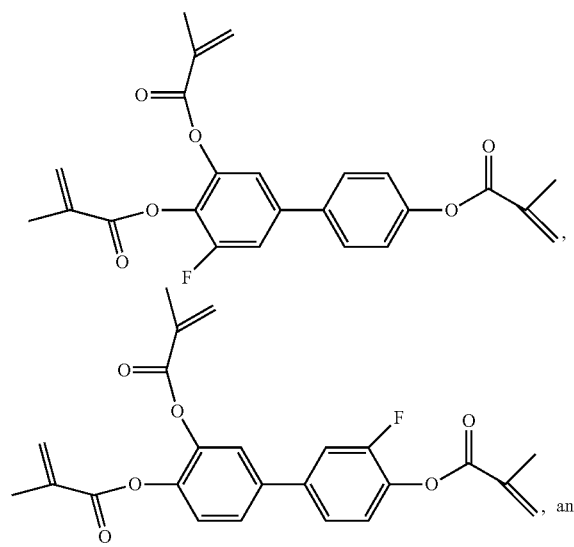

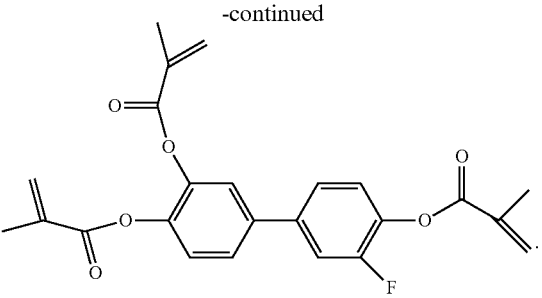

2. The liquid crystal composition in claim 1, wherein the polar component is represented by the formula:

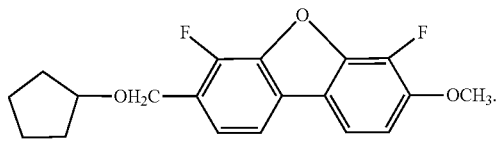

3. The liquid crystal composition in claim 1, wherein the polar component is represented by the formula:

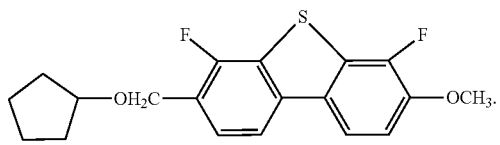

4. The liquid crystal composition in claim 1, wherein the polar component is represented by the formula:

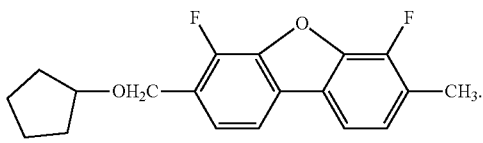

5. The liquid crystal composition in claim 1, wherein the polar component is represented by the formula:

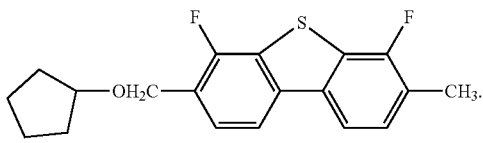

6. The liquid crystal composition in claim 1, wherein the polar component is represented by the formula:

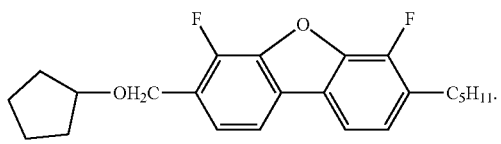

7. The liquid crystal composition in claim 1, wherein the polar component is represented by the formula:

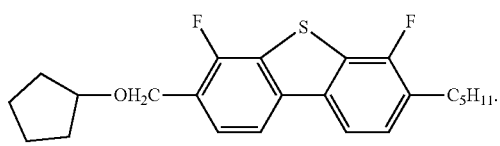

8. The liquid crystal composition in claim 1, wherein the polymerizable component is represented by the formula:

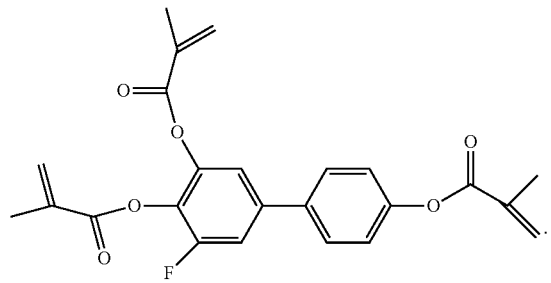 [SMILES: C=C(C)C(=O)Oc1ccc(-c2cc(F)c(OC(=O)C(=C)C)c(OC(=O)C(=C)C)c2)cc1]

9. The liquid crystal composition in claim 1, wherein the polymerizable component is represented by the formula:

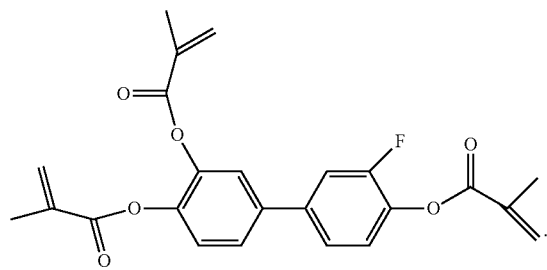 [SMILES: C=C(C)C(=O)Oc1ccc(-c2ccc(OC(=O)C(=C)C)c(OC(=O)C(=C)C)c2)cc1F]

10. The liquid crystal composition in claim 1, wherein the polymerizable component is represented by the formula:

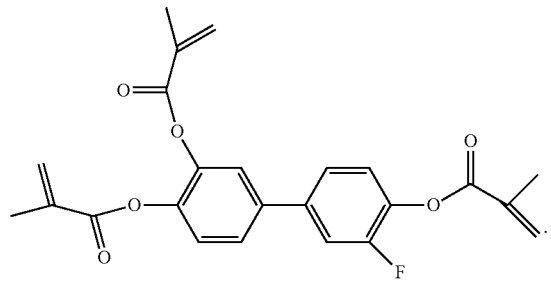 [SMILES: C=C(C)C(=O)Oc1ccc(-c2ccc(OC(=O)C(=C)C)c(OC(=O)C(=C)C)c2)cc1F]

11. The liquid crystal display panel, comprising:
a first substrate;
a second substrate; and
a liquid crystal cell disposed between the first substrate and the second substrate, wherein the liquid crystal cell comprises the liquid crystal composition in claim 1.

12. The liquid crystal display panel in claim 11, wherein the polar component is represented by the formula:

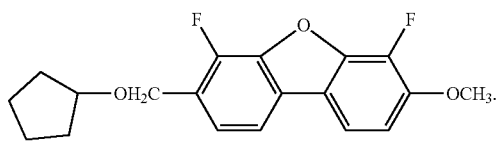

13. The liquid crystal display panel in claim 11, wherein the polar component is represented by the formula:

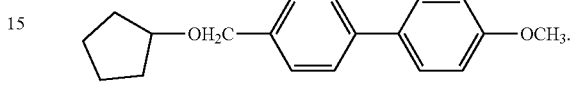

14. The liquid crystal display panel in claim 11, wherein the polar component is represented by the formula:

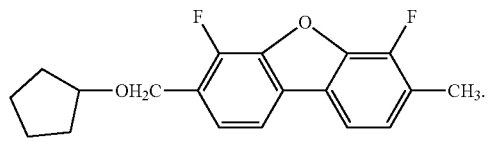

15. The liquid crystal display panel in claim 11, wherein the polar component is represented by the formula:

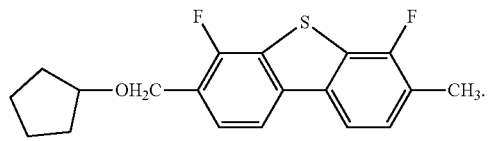

16. The liquid crystal display panel in claim 11, wherein the polar component is represented by the formula:

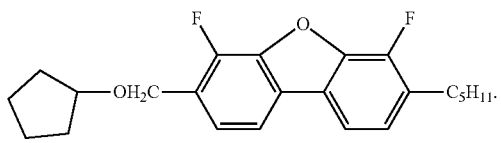

17. The liquid crystal display panel in claim 11, wherein the polar component is represented by the formula:

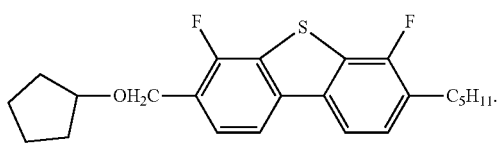

18. A manufacturing method of a liquid crystal display panel, comprising following steps:
providing a first substrate and a second substrate;
aligning the first substrate and the second substrate to form a liquid crystal cell;

inpouring the liquid crystal composition in claim 1 into the liquid crystal cell; and irradiating the liquid crystal cell with UV light to obtain the liquid crystal display panel.

\* \* \* \* \*